3,185,564
METHOD OF AGGLOMERATING IRON ORE FINES
Richmond E. Perry, 432 16th Court NW.,
Birmingham, Ala.
No Drawing. Filed Apr. 24, 1964, Ser. No. 362,529
31 Claims. (Cl. 75—3)
(Granted under Title 35, U.S. Code (1952), sec. 266)

This application is a continuation-in-part of my application Serial No. 857,235, filed December 3, 1959, now abandoned, for a Method of Agglomerating Iron Ore Fines.

The invention herein described and claimed may be manufactured and used by or for the Government of the United States of America for governmental purposes without the payment of royalties thereon or therefor.

This invention relates to a method for briquetting or agglomerating finely divided material, such as iron ores, and the novel article and composition of matter resulting therefrom. More specifically, it relates to the briquetting of iron ore employing an iron salt, a lignin material and an alkali to form masses having the size, shape, and mechanical properties adequate to meet the requirements for a blast furnace feed.

As employed herein, the term "iron ore" refers not only to naturally occurring minerals but also to other iron oxide materials which may be employed as blast furnace feeds. Such materials include, in addition to the naturally occurring limonite, magnetite, etc., materials as blast furnace flue dusts and artificial magnetites, e.g. Nicaro tailings. The latter is produced in large quantities in the recovery of nickel from the laterite deposits of Cuba. A tailing product consisting mainly of $Fe_3O_4$ is recovered which can be concentrated magnetically.

Four major processes are employed currently in the preparation of blast furnace feed from iron ore fines. These are sintering, nodulizing in rotary kilns, briquetting and pelletizing. The physical state and quality of the iron ore or iron ore concentrate are the main factors in determining whether a particular agglomerating process can be used economically. A briquetting or pelletizing process employing inexpensive bonding ingredients wherein standard pelletizing or briquetting machines may be employed would require a lower capital investment than one involving elaborate heat treating equipment.

The main object of this invention, therefore, is to provide an improved and more economical method of forming iron ore fines or concentrates into shaped particles of a size and shape which meet the requirement for blast furnace feed.

It is a further object of this invention to prepare an ore pellet or briquette suitable as a blast furnace feed by admixing ore fines with a substantially neutral or alkaline lignin-containing solution or dispersion, an iron salt, and an alkali, with an alkali metal silicate as an optional ingredient.

Yet another object of this invention is to prepare an ore pellet or briquette from a finely divided iron ore by admixing with a small amount of acid to form an iron salt in situ and then admixing with substantially neutral or alkaline lignin-containing solution and alkali.

Further objects will become apparent from the rest of the disclosure, including the claims.

I have found that certain neutral or alkaline lignins or lignin derivatives, dispersed or dissolved in water can be mixed with finely divided iron ore, iron salts and alkali and formed into pellets or briquettes, which after being dried are quite strong mechanically and readily withstand the handling and impacts encountered in shipping or in charging them into a blast furnace. Examples of such lignin solutions or dispersions are waste sulfate liquor (black liquor) and Marasperse CB (a commercial lignin sulfonate derivative), which are aqueous lignin dispersions derived respectively from the sulfate and sulfite processes for treatment of wood pulp.

The following example illustrates the method of preparation of the improved ore briquette. All parts are by weight.

EXAMPLE I

A mixture of 60 parts of waste sulfate liquor of about 50% solids content, 3 parts of ferric chloride and 3 parts of sodium hydroxide are added to a mixture of 1000 parts of minus 35 mesh size iron ore wetted with 150 parts of water. The mass is then thoroughly mixed in a pug mill, or any other conventional mixing device. After mixing is completed the mass is removed from the device and allowed to set for about an hour. It is then fed into an extruding device to form pellets or briquettes ¾ inch in diameter and 1½ inches long, and allowed to set for about one hour. The shapes are then stored and allowed to dry in a sheltered place. Alternatively, they may be placed in a drying oven and dried at relatively low heat to drive off the moisture. In one method the extruded material may be fed onto a travelling grate type conveyor, which conveys it at a controlled rate through a furnace containing hot gases in the range of 300° F. to 1200° F.

Instead of ferric chloride, an equivalent amount of other iron salts, preferably of inorganic acids, such as ferrous sulfate, or nitrate, may be substituted. The iron salts may be formed in situ by adding the required amount of corresponding acid to the ore and mixing thoroughly.

Artificial magnetite (e.g. Nicaro tailings) may be employed by mixing with equal parts of hematite and then adding the lignin material, ferric chloride and an alkali, thoroughly mixing, shaping into pellets and drying.

The sodium hydroxide may be replaced by equivalent amounts of sodium or potassium carbonate, or potassium hydroxide. In another embodiment an equal amount of potassium hydroxide is employed along with the sodium hydroxide.

If desired, an alkali metal silicate may be added to the composition, such as for example 3 parts of sodium silicate to the mixture of waste sulfate liquor, ferric chloride and sodium hydroxide set forth above.

The proportions of ingredients employed may be varied within broad ranges, depending on the properties of the ore employed, the lignin material selected, components present and the particular requirements to be met and are, therefore, best determined empirically. Optimum percentages of ingredients, based on the amount of ore, for most purposes have been found to be as follows: lignin material—about 2% to about 5%, iron salt—about 0.2% to about 1.0%, alkali—about 0.2% to about 1.0% and alkali metal silicate—about 0.2 to about 1.0%.

The following table gives the results of a drop test with hematite and limonite pellets made from various binding mixtures according to the example and dried at a temperature of 300° F.

In the test three pellets were dropped 30 feet onto a flat iron plate. Each pellet was dropped five times and screened after each drop to remove the −10 mesh particles.

*Reagent combinations and drop test data pertaining to evaluation of the various combinations as binders for making iron ore pellets*

[Percent +10 mesh after number drops indicated]

| Reagents | Ore | 1 | 2 | 3 | 4 | 5 |
|---|---|---|---|---|---|---|
| Sulfate liquor plus: | | | | | | |
| 1. Ferric chloride and sodium hydroxide | −65 mesh hematite | 94.8 | 87.5 | 80.0 | 72.7 | 66.7 |
| 2. Ferric sulfate | do | 88.3 | 73.6 | 59.1 | 46.3 | 37.1 |
| 3. Ferric chloride | do | 91.1 | 79.5 | 66.5 | 55.5 | 46.8 |
| 4. Ferric chloride and sodium carbonate | do | 93.4 | 84.5 | 74.6 | 64.9 | 55.6 |
| 5. Ferric chloride and sodium hydroxide | do | 94.8 | 87.5 | 80.0 | 72.7 | 66.7 |
| 6. Ferric chloride, potassium hydroxide and sodium hydroxide. | do | 98.3 | 96.0 | 93.2 | 90.6 | 87.8 |
| 7. Ferric chloride, sodium hydroxide, and sodium silicate. | −35 mesh limonite | 97.7 | 94.2 | 92.3 | 90.5 | 88.7 |
| 8. Ferric chloride, sodium hydroxide | Artificial magnetite (Concentrate from Nicaro tailings and hematite slime). | 96.0 | 92.1 | 88.1 | 83.9 | 80.7 |
| Marasperse CB plus: | | | | | | |
| 9. Ferric chloride and sodium hydroxide | −65 mesh hematite | 95.4 | 89.9 | 85.1 | 80.9 | 75.9 |
| 10. Ore +HCl, sulfate liquor and NaOH | −43 mesh Venezuelan ore (hematite) | 99.3 | 97.7 | 94.0 | 89.4 | 85.8 |

This table shows that there is a significant improvement in the ability of the pellets to withstand dropping when an alkali is incorporated in the pelletizing mixture.

*Example II*

This example shows forming the iron salt in situ.

To 500 grams of dehydrated Venezuelan iron ore of minus 48 mesh size was added 50 ccs. of water and 10 ccs. of concentrated hydrochloric acid. The mass was thoroughly mixed and then 30 grams of waste sulfate liquor and 3 grams of sodium hydroxide was added. After mixing thoroughly the mass was formed into pellets and dried as in the previous example. The results of the drop test with these pellets is shown in item 10 of the table.

The invention is not to be construed as being limited solely to the agglomeration of the above described iron ore fines. Various changes and modifications of the invention, various steps and components can be introduced, as is apparent to those skilled in the art, without departing from the spirit of the invention, or its scope as defined by the appended claims.

What is claimed is:

1. A process for agglomerating a finely divided iron ore which comprises admixing therewith (1) an aqueous dispersion of a lignin material from the group consisting of a substantially neutral and an alkaline lignin material, the proportions of the lignin material being from about 2 percent to about 5 percent based on the weight of the ore, (2) an inorganic iron salt in an amount of from about 0.2 percent to about 1.0 percent based on the weight of the ore, (3) an alkali metal base in an amount of from about 0.2 percent to about 1.0 percent based on the weight of the ore, mixing the ingredients to form a uniform mass, compacting the mass into suitable shapes and drying said shapes.

2. The process of claim 1 in which the iron ore is magnetite.

3. The process of claim 1 in which the iron ore is a mixture of artificial magnetite and hematite.

4. The process of claim 1 in which the lignin material is from the group consisting of waste sulfate liquor and a lignin sulfonate from the sulfite process for treatment of wood pulp.

5. The process of claim 4 in which the lignin material is waste sulfate liquor.

6. The process of claim 1 in which the iron salt is from the group consisting of ferric chloride, ferrous sulfate and ferrous nitrate.

7. The process of claim 6 in which the iron salt is ferric chloride.

8. The process of claim 1 in which the iron salt is prepared in situ.

9. The process of claim 8 in which the iron salt is ferric chloride and is prepared by reaction of the ore with hydrochloric acid.

10. The process of claim 1 in which the alkali metal base is from the group consisting of sodium hydroxide, potassium hydroxide, sodium carbonate and mixtures thereof.

11. The process of claim 10 in which the alkali metal base is sodium hydroxide.

12. The process of claim 1 in which the amount of lignin material is about 3 percent based on the weight of the ore.

13. The process of claim 1 in which the amount of iron salt is about 0.3 percent based on the weight of the ore.

14. The process of claim 1 in which the amount of alkali metal base is about 0.3 percent based on the weight of the ore.

15. The process of claim 1 in which sodium silicate is added as a fourth ingredient of the mixture.

16. The process of claim 15 in which the amount of sodium silicate is from about 0.2 percent to about 1.0 percent based on the weight of the ore.

17. The process of claim 16 in which the amount of sodium silicate is about 0.3 percent based on the weight of the ore.

18. A dried ore agglomerate comprising finely divided iron ore admixed with (1) from about 2 percent to about 5 percent, based on the weight of the ore, of a lignin material from the group consisting of a substantially neutral and an alkaline lignin material, (2) from about 0.2 percent to about 1.0 percent of an inorganic iron salt, and (3) from about 0.2 percent to about 1.0 percent of an alkali metal base.

19. The agglomerate of claim 18 in which the ore is magnetite.

20. The agglomerate of claim 18 in which the ore is a mixture of artificial magnetite and hematite.

21. The agglomerate of claim 18 in which the lignin material is from the group consisting of waste sulfate liquor and a lignin sulfonate from the sulfite process for treatment of wood pulp.

22. The agglomerate of claim 21 in which the lignin material is waste sulfate liquor.

23. The agglomerate of claim 18 in which the iron salt is from the group consisting of ferric chloride, ferrous sulfate and ferrous nitrate.

24. The agglomerate of claim 23 in which the iron salt is ferric chloride.

25. The agglomerate of claim 18 in which the alkali metal base is from the group consisting of sodium hydroxide, potassium hydroxide, sodium carbonate and mixtures thereof.

26. The agglomerate of claim 25 in which the alkali metal base is sodium hydroxide.

27. The agglomerate of claim 18 in which the amount of lignin material is about 3 percent based on the weight of the ore.

28. The agglomerate of claim 18 in which the amount of iron salt is about 0.3 percent based on the weight of the ore.

29. The agglomerate of claim 18 in which the amount of alkali metal base is about 0.3 percent based on the weight of the ore.

30. The agglomerate of claim 18 which additionally contains from about 0.2 percent to about 1.0 percent of sodium silicate based on the weight of the ore.

31. The agglomerate of claim 30 in which the amount of sodium silicate is about 0.3 percent based on the weight of the ore.

No references cited.

BENJAMIN HENKIN, *Primary Examiner.*